(12) United States Patent
Wang et al.

(10) Patent No.: US 7,443,638 B2
(45) Date of Patent: Oct. 28, 2008

(54) MAGNETORESISTIVE STRUCTURES AND FABRICATION METHODS

(75) Inventors: Yu-Jen Wang, Hsin-Chu (TW); Chih-Huang Lai, Hsin-Chu (TW); Wen-Chin Lin, Hsin-Chu (TW); Denny Tang, Saratoga, CA (US); Chao-Hsiung Wang, Hsin-Chu (TW)

(73) Assignee: Taiwan Semiconductor Manufacturing Company Ltd., Hsinchu (TW)

( * ) Notice: Subject to any disclaimer, the term of this patent is extended or adjusted under 35 U.S.C. 154(b) by 278 days.

(21) Appl. No.: 10/907,974

(22) Filed: Apr. 22, 2005

(65) Prior Publication Data

US 2006/0238925 A1  Oct. 26, 2006

(51) Int. Cl.
*G11B 5/39* (2006.01)
*G11B 5/33* (2006.01)

(52) U.S. Cl. .............. 360/324.12; 360/324.1; 360/324.11

(58) Field of Classification Search ......... 360/324, 360/324.1, 324.11, 324.12, 314
See application file for complete search history.

(56) References Cited

U.S. PATENT DOCUMENTS

| | | | |
|---|---|---|---|
| 5,650,958 | A | 7/1997 | Gallagher et al. |
| 6,166,948 | A | 12/2000 | Parkin et al. |
| 6,259,586 | B1 * | 7/2001 | Gill .................. 360/324.2 |
| 6,400,536 | B1 * | 6/2002 | Gill .................. 360/324.12 |
| 6,438,026 | B2 * | 8/2002 | Gillies et al. .......... 365/158 |
| 6,600,638 | B2 * | 7/2003 | Gill .................. 360/324.11 |
| 6,606,219 | B2 | 8/2003 | Lam |
| 6,636,393 | B1 | 10/2003 | Araki et al. |
| 6,650,513 | B2 | 11/2003 | Fullerton et al. |
| 6,657,828 | B2 | 12/2003 | Araki et al. |
| 6,721,146 | B2 | 4/2004 | Beach |
| 6,728,083 | B2 | 4/2004 | Pinarbasi |
| 6,756,135 | B2 | 6/2004 | Hasegawa et al. |
| 6,791,792 | B2 | 9/2004 | Takahashi |
| 7,038,894 | B2 * | 5/2006 | Inomata et al. .......... 360/324.2 |

(Continued)

FOREIGN PATENT DOCUMENTS

JP        08264861 A    * 10/1996

OTHER PUBLICATIONS

Lai et al. "Biquadratic coupling through nano-oxide layers in pinned layers of IrMn-based spin valves," Nov. 15, 2002, Journal of Applied Physics, vol. 93, No. 10, pp. 8412-8414).*

*Primary Examiner*—William J. Klimowicz
(74) *Attorney, Agent, or Firm*—Baker & McKenzie LLP

(57) ABSTRACT

Disclosed herein is a magnetoresistive structure, for example useful as a spin-valve or GMR stack in a magnetic sensor, and a fabrication method thereof. The magnetoresistive structure uses twisted coupling to induce a perpendicular magnetization alignment between the free layer and the pinned layer. Ferromagnetic layers of the free and pinned layers are exchange-coupled using antiferromagnetic layers having substantially parallel exchange-biasing directions. Thus, embodiments can be realized that have antiferromagnetic layers formed of a same material and/or having a same blocking temperature. At least one of the free and pinned layers further includes a second ferromagnetic layer and an insulating layer, such as a NOL, between the two ferromagnetic layers. The insulating layer causes twisted coupling between the two ferromagnetic layers, rotating the magnetization direction of one 90 degrees relative to the magnetization direction of the other.

13 Claims, 4 Drawing Sheets

U.S. PATENT DOCUMENTS

| | | | |
|---|---|---|---|
| 7,106,561 B2 * | 9/2006 | Carey et al. | 360/324.12 |
| 7,187,576 B2 * | 3/2007 | Braun et al. | 365/158 |
| 7,199,984 B2 * | 4/2007 | Carey et al. | 360/324.12 |
| 2002/0048127 A1 | 4/2002 | Fukuzawa et al. | |
| 2003/0002231 A1 * | 1/2003 | Dee | 360/324.12 |
| 2003/0039062 A1 | 2/2003 | Takahasahi | |
| 2003/0179518 A1 | 9/2003 | Gill | |
| 2004/0004261 A1 | 1/2004 | Takahasahi et al. | |
| 2004/0085683 A1 * | 5/2004 | Lin et al. | 360/314 |
| 2004/0114280 A1 | 6/2004 | Yoshikawa et al. | |
| 2005/0207070 A1 * | 9/2005 | Carey et al. | 360/324.1 |
| 2005/0207073 A1 * | 9/2005 | Carey et al. | 360/324.12 |
| 2006/0044707 A1 * | 3/2006 | Araki et al. | 360/324.12 |
| 2006/0202244 A1 * | 9/2006 | Ju et al. | 257/295 |
| 2006/0221509 A1 * | 10/2006 | Carey et al. | 360/324.2 |

\* cited by examiner

MAGNETORESISTIVE STRUCTURES AND FABRICATION METHODS

TECHNICAL FIELD

The present invention relates generally to semiconductor devices, and more particularly to magnetoresistive structures useful for magnetic sensing devices.

BACKGROUND

Magnetic sensors such as those used in disk drives or tape drives often include multi-layered magnetoresistive (MR) structures. The MR structures typically include a pair of ferromagnetic layers separated by a nonmagnetic spacer layer. One of the ferromagnetic layers is designated as a free layer, meaning that the direction of magnetization is free to change in the presence of an external magnetic field. The other ferromagnetic layer is designated as a pinned layer, meaning that its magnetization direction is fixed in a particular direction.

A useful property of such an MR structure is that its electrical resistance depends on the relative orientations of the magnetization directions of the free and pinned layers. Thus, MR structures can be used for detecting the presence of an external magnetic field. For example, in disk drives a sensor having an MR structure is used to detect data stored in the form of tiny magnetic fields on a recording medium (e.g., magnetic disk).

In many applications, such as linear-response read heads for disk drives, an MR structure is needed where the magnetization direction of the free layer is perpendicular to the magnetization of the pinned layer. There are several conventional methods for providing this orthogonal orientation. One method is the so-called hard biasing method, for example as described in U.S. Pat. No. 6,756,135 to Hasegawa et al., titled "Spin Valve Thin-Film Magnetic Element." This method has some undesirable attributes such as gradual reduction of sensitivity at track edges and is somewhat difficult to control in manufacturing.

Another common method is to set the magnetization directions of the free and pinned layers through the use of exchange coupling with adjacent antiferromagnetic (AFM) layers. The AFM layers are initialized or "set" during manufacturing to different magnetization directions that are perpendicular to each other. In order to set the magnetization direction for an AFM layer, it must be heated to a particular blocking temperature (e.g., at or near the Neel temperature of the AFM material) in the presence of a magnetic field having an appropriate field direction. Thus, the steps of heating and subsequent cooling in a field of a particular field direction would be appropriate for one of the AFM layers, but not the other. Thus, two different AFM materials are used that have distinctly different blocking temperatures. The AFM layer with the highest blocking temperature is set first. Then the field angle is rotated 90 degrees and the second AFM layer is set at a lower temperature.

SUMMARY

Disclosed herein is a new free layer structure for inducing a perpendicular magnetization alignment between the free layer and the pinned layer of an MR structure (e.g., spin-valve or giant magnetoresistive (GMR) sensor) by one annealing process. This allows for simplification of the annealing process for setting the exchange biasing direction, as well as providing for a perpendicular coupling between the free and pinned layers for allowing highly linear response read heads/systems.

For applications such as read heads or other magnetic sensors, a highly sensitive response to an applied magnetic field is important. In order to achieve maximum sensitivity and linearity, the magnetization of the free layer in the absence of an applied field should be substantially parallel with the direction of a recorded track. Accordingly, the magnetization of the pinned layer should be substantially perpendicular to the recorded track. Thus, the sensitivity of an MR structure can be enhanced by setting the magnetization direction of the free layer perpendicular to the magnetization direction of the pinned layer.

As disclosed herein, an MR structure having a perpendicular magnetization alignment between the free layer and the pinned layer is achieved through the use of a new multilayered structure that includes a pair of ferromagnetic layers interposed by an insulating layer, designated as a NOL (Nano Oxide Layer) or simply an oxide layer for convenience. Note that materials other than an oxide can be used, for example a nitride, boride, or fluoride. This new structure can be incorporated into a free layer of a magnetoresistive structure. For example, the free layer can include an insulating layer provided between a top-free (ferromagnetic) layer and a bottom-free (ferromagnetic) layer. A nonmagnetic spacer can be used to separate the bottom-free layer from a pinned (ferromagnetic) layer. Antiferromagnetic (AFM) layers can be provided adjacent to the top-free layer and the pinned layer. The resulting structure can thus include layers AFM/top-free/NOL/bottom-free/spacer/pinned/AFM.

The exchange biasing direction of both AFM layers can be initialized or "set" by a single post-annealing step in the presence of a magnetic field having an appropriate field-annealing direction. The initializing of the AFM layers sets the easy axis of the pinned layer and the top-free layer by exchange coupling, causing the pinned layer and the top-free layer to have parallel magnetization directions. At the same time, the easy axis of the bottom-free layer rotates 90 degrees from the easy axis of the top-free layer due to biquadratic (or "twisted") coupling caused by the interposing NOL layer. This means that the magnetization direction of the bottom-free layer is set perpendicular to the magnetization direction of the pinned layer. Thus, a perpendicular coupling between the free and pinned layers can be obtained in an MR structure that can be fabricated and subjected to only a single annealing step for exchange-bias initialization.

Variations on this MR structure can include adding a synthetic antiferromagnetic (SAF) layer to the free layer. The SAF layer helps stabilize magnetization in the free layer by limiting the effects of undesirable magnetostatic couplings within the free layer, allowing for an MR structure having greater precision and/or smaller dimensions. Other variations can include MR structures where the 90 degree twist in magnetization directions is induced in the pinned layer in addition to, or instead of, in the free layer. For example, the pinned layer can include a series of layers such as top-pinned/NOL/bottom-pinned/AFM, where the magnetization direction of the bottom-pinned layer is set by exchange coupling with the AFM, and the magnetization direction of the top-pinned layer is rotated 90 degrees from the magnetization direction of the bottom-pinned layer due to twisted coupling caused by the interposing insulating layer. In addition, a SAF can be included in the pinned layer for magnetostatic coupling control.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
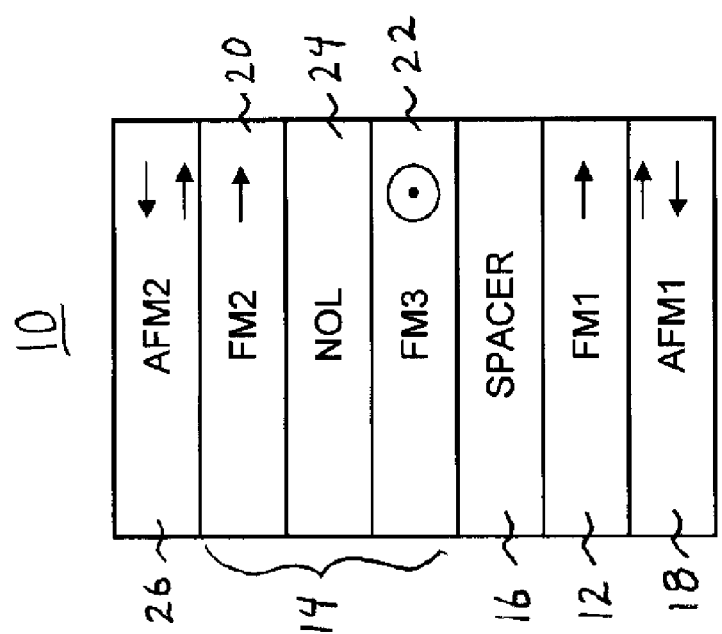
FIG. 1 shows a first embodiment of a stack of layers of a magnetoresistive (MR) structure.

FIG. 1 shows, as a first embodiment, a stack 10 of layers of a magnetoresistive (MR) structure. The stack 10 includes a pinned layer 12 and a free layer 14 separated by a nonmagnetic spacer layer 16. The pinned layer 12 includes a layer (FM1) of ferromagnetic material. The pinned layer 12 is formed over an antiferromagnetic (AFM) layer (AFM1) 18. The free layer 14 is a synthetic free layer that includes a ferromagnetic layer (FM2) 20 and a ferromagnetic layer (FM3) 22 separated by an insulating layer (NOL) 24. An AFM layer (AFM2) 26 is formed over the free layer 14. Additional layers (not shown) of the MR structure can include electrodes, substrate, and/or protective layers.

In the stack 10, the pinned magnetization direction of the pinned layer (FM1) 12 is substantially parallel to the magnetization direction of the ferromagnetic layer (FM2) 20. The magnetization direction of the pinned layer (FM1) 12 is set by exchange coupling with the AFM layer (AFM1) 18, and the magnetization direction of the pinned layer (FM2) 20 is set by exchange coupling with the AFM layer (AFM2) 26. Thus, the exchange biasing direction of the AFM layer (AFM1) 18 is substantially parallel to the exchange biasing direction of the AFM layer (AFM2) 26. Throughout this disclosure, references to a "magnetization direction" or "direction of magnetization" of a layer or other structure are intended to refer to a predominant magnetization direction among magnetization directions of the magnetic domains within the layer or structure.

To set the exchange biasing direction, the AFM layers 18 and 26 can be concurrently set by annealing in the presence of a magnetic field having an appropriate field direction. To be more specific, an annealing process for initializing the AFM layers 18 and 26 establishes an exchange biasing direction in one of the AFM layers (e.g., AFM layer 18) that is substantially parallel to an exchange biasing direction in the other AFM layer (e.g., AFM layer 26). This is accomplished by heating the stack 10 to a blocking temperature common to both of the AFM layers 18 and 26, then imposing a magnetic field having a desired magnetic field direction on the stack 10, then allowing the stack 10 to cool to an ambient temperature while maintaining the magnetic field on the stack 10. The AFM layers 18 and 26 are then said to be "set" or initialized. In this embodiment, the AFM layers 18 and 26 have the same, or at least substantially the same, blocking temperature. Thus, the same material, or at least substantially the same material, can be used for both of the AFM layers 18 and 26, allowing their magnetization directions to be concurrently set.

The magnetization direction of the ferromagnetic layer (FM3) 22 is substantially perpendicular to the magnetization direction of the pinned layer (FM1) 12 and the magnetization direction of the ferromagnetic layer (FM2) 20. The magnetization direction of the ferromagnetic layer (FM3) 22 is set substantially perpendicular to the magnetization direction of ferromagnetic layer (FM2) 20 by twisted coupling (also known as "biquadratic coupling") caused by the insulating layer (NOL) 24. That is, the insulating layer 24 is used between the ferromagnetic layers 20 and 22 to induce a rotation of approximately 90 degrees in the magnetization direction of the ferromagnetic layer 22 relative to the field-annealing direction. The phenomenon responsible for this field rotation is described in greater detail in Chih-Huang Lai, *Biquadratic Coupling Through Nano-Oxide Layers in Pinned Layers of IrMn-Based Spin Valves*, Journal of Applied Physics, Vol 91(10) pp. 6684-6690 (May 15, 2002), the contents of which are hereby incorporated by reference.

In the described embodiment, a perpendicular coupling between the free layer 14 and the pinned layer 12 can be obtained by a single pinning heat treatment, e.g., by a one-step post-annealing AFM initialization process. More specifically, since the pinned direction of magnetization of the pinned layer (FM1) 12 is substantially parallel to the magnetization direction of the ferromagnetic layer (FM2), and these magnetization directions are set by exchange coupling with the AFM layer (AFM1) 18 and the AFM layer (AFM2) 26, respectively, a single annealing process can be used to set the AFM layer (AFM1) 18 and the AFM layer (AFM2) 26. The insulating layer (NOL) 24 can be an oxide layer formed so as to cause the magnetization direction of the ferromagnetic layer (FM3) 22 to rotate 90 degrees from the magnetization direction of the ferromagnetic layer (FM2) 20. The result, as illustrated in FIG. 1, is an MR structure having a perpendicular alignment between the magnetization directions of the free layer 14 and the pinned layer 12 that can be implemented with only a single annealing process for concurrently setting both AFM layers 18, 26.

Figure 2:
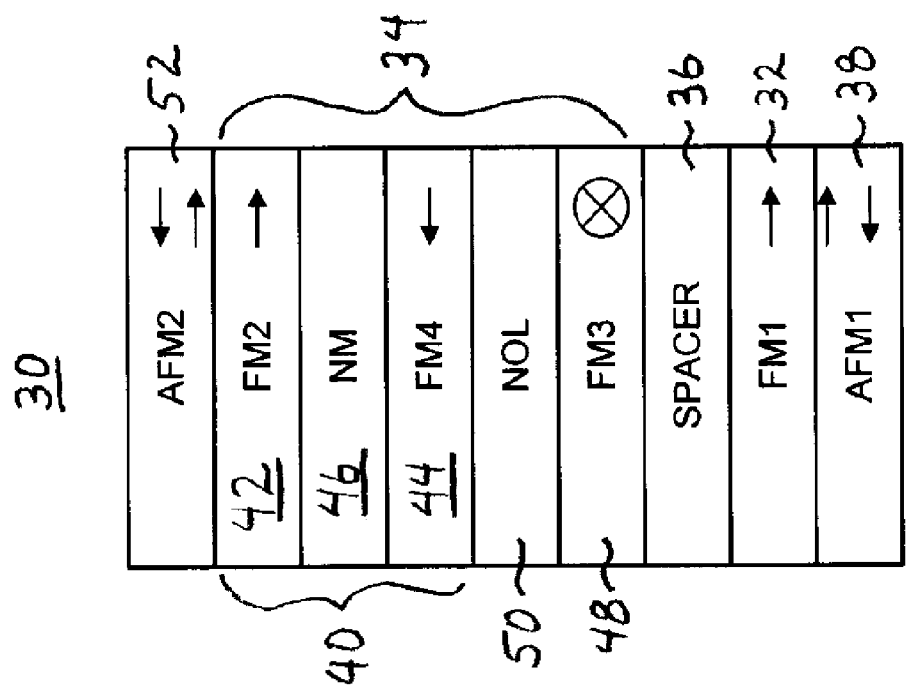
FIG. 2 shows a second embodiment of a stack of layers of an MR structure.

FIG. 2 shows, as a second embodiment, a stack 30 of layers of a magnetoresistive (MR) structure. The stack 30 includes a pinned layer 32 and a free layer 34 separated by a nonmagnetic spacer layer 36. The pinned layer 32 includes a layer (FM1) of ferromagnetic material. The pinned layer 32 is formed on an AFM layer (AFM1) 38. The free layer 34 includes a synthetic antiferromagnetic (SAF) layer 40. The SAF layer 40 includes a ferromagnetic layer (FM2) 42 and a ferromagnetic layer (FM4) 44 separated by a nonmagnetic layer (NM) 46. The free layer 34 also includes a ferromagnetic layer (FM3) 48. The free layer 34 further includes an insulating layer (NOL) 50 between the ferromagnetic layer (FM3) 48 and the SAF layer 40. An AFM layer (AFM2) 52 is formed on the free layer 34. Additional layers (not shown) of the MR structure can include electrodes and/or protective layers.

The stack 30 differs from the stack 10 of the first embodiment in that the stack 30 includes a SAF 40. In the SAF 40, the magnetization direction of the ferromagnetic layer (FM 4) is antiparallel to the magnetization direction of the ferromagnetic layer (FM2) due to RKKY (Ruderman-Kittel-Kasuya-Yosida) coupling caused by the nonmagnetic layer (NM) 46, which can be formed of, for example, ruthenium (Ru). A benefit of the SAF 40 is that it reduces magnetostatic coupling felt by the ferromagnetic layer (FM3) 48 in stack 30 compared to that felt by the ferromagnetic layer (FM3) 22 in stack 10. To be more specific, in the stack 10, a certain amount of magnetostatic coupling can exist between the ferromagnetic layer (FM2) 20 and the ferromagnetic layer (FM3) 22 due to a magnetic field emanating from the edges of the ferromagnetic layer (FM2) 20 down towards the ferromagnetic layer (FM3) 22. As a result, in the stack 10 the size (e.g., width and/or length) of the ferromagnetic layer (FM3) 22 must be made large enough so that it has a sufficiently high coercivity to avoid altering of its magnetization direction by magnetostatic coupling from the ferromagnetic layer (FM2) 20. However, in the stack 30, the magnetic field emanating from the edges of the ferromagnetic layer (FM4) 44 are pulled up towards the ferromagnetic layer (FM2) 42, reducing or eliminating magnetostatic coupling felt by the ferromagnetic layer (FM3) 48. Thus, a benefit of the SAF 40 is that the stack 30 can be made smaller in size (e.g., width and/or length) compared to the stack 10.

In stack 30, the pinned direction of magnetization of the pinned layer (FM1) 32 is substantially parallel to the magnetization direction of the ferromagnetic layer (FM2) 42. The magnetization directiIon of the pinned layer (FM1) 32 is set by exchange coupling with the AFM layer (AFM1) 38, and the magnetization direction of the pinned layer (FM2) 42 is set by exchange coupling with the AFM layer (AFM2) 52. The magnetization direction of the ferromagnetic layer (FM4) 44 is antiparallel to the magnetization direction of the ferromagnetic layer (FM2) 42 as discussed above. The magnetization direction of the ferromagnetic layer (FM3) 48 is substantially perpendicular to the magnetization direction of the pinned layer (FM1) 32 and the magnetization direction of the ferromagnetic layer (FM4) 44. The magnetization direction of the ferromagnetic layer (FM3) 48 is set substantially perpendicular to the magnetization direction of ferromagnetic layer (FM4) 44 by twisted coupling caused by the insulating layer (NOL) 50 as discussed above in connection with stack 10. Thus, like stack 10, in stack 30 a perpendicular coupling between the free layer 34 and the pinned layer 32 can be obtained by a single pinning heat treatment, e.g., by a one-step annealing process.

Figures 3, 4:
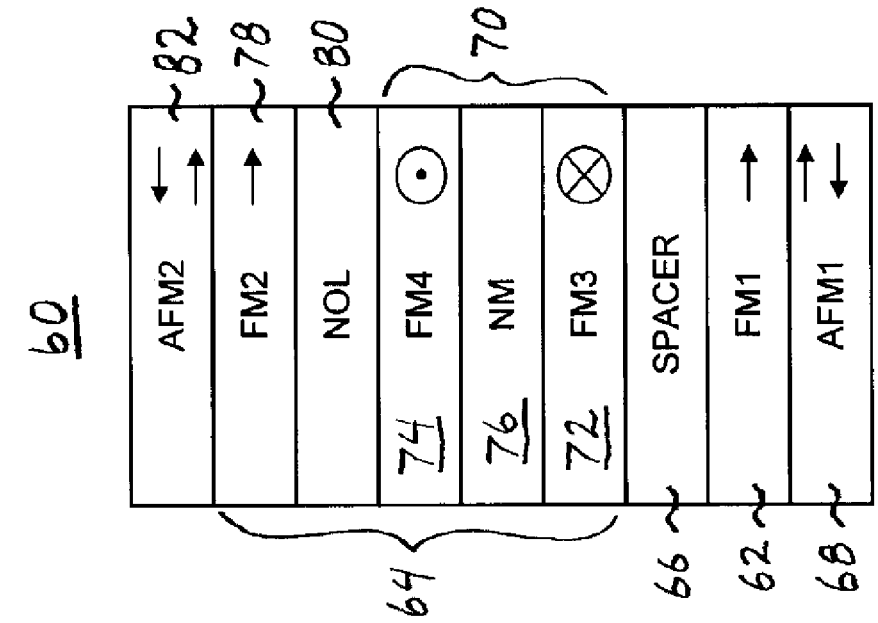
FIG. 3 shows a third embodiment of a stack of layers of an MR structure.
FIG. 4 shows a fourth embodiment of a stack of layers of an MR structure.

FIG. 3 shows, as a third embodiment, a stack 60 of layers of a magnetoresistive (MR) structure. The stack 60 includes a pinned layer 62 and a free layer 64 separated by a nonmagnetic spacer layer 66. The pinned layer 62 includes a layer (FM1) of ferromagnetic material. The pinned layer 62 is formed on an AFM layer (AFM1) 68. The free layer 64 includes a synthetic antiferromagnetic (SAF) layer 70. The SAF layer 70 includes a ferromagnetic layer (FM3) 72 and a ferromagnetic layer (FM4) 74 separated by a nonmagnetic layer (NM) 76. The free layer 64 also includes a ferromagnetic layer (FM2) 78. The free layer 64 further includes an insulating layer (NOL) 80 between the ferromagnetic layer (FM2) 78 and the SAF layer 70. An AFM layer (AFM2) 82 is formed on the free layer 64. Additional layers (not shown) of the MR structure can include electrodes and/or protective layers.

The stack 60 illustrates an alternative approach to the second embodiment, showing that the free layer 34 of the second embodiment can be inverted, resulting in the free layer 64 of the third embodiment.

In stack 60, the pinned direction of magnetization of the pinned layer (FM1) 62 is substantially parallel to the magnetization direction of the ferromagnetic layer (FM2) 78. The magnetization direction of the pinned layer (FM1) 62 is set by exchange coupling with the AFM layer (AFM1) 68, and the magnetization direction of the pinned layer (FM2) 78 is set by exchange coupling with the AFM layer (AFM2) 82. The magnetization direction of the ferromagnetic layer (FM4) 74 is perpendicular to the magnetization direction of the ferromagnetic layer (FM2) 78 due to twisted coupling caused by the insulating layer (NOL) 80 as discussed above in connection with stack 10. The magnetization direction of the ferromagnetic layer (FM3) 72 is substantially perpendicular to magnetization direction of the pinned layer (FM1) 62 and is antiparallel to the magnetization direction of the ferromagnetic layer (FM4) 74. The magnetization direction of the ferromagnetic layer (FM3) 72 is set antiparallel to the magnetization direction of ferromagnetic layer (FM4) 74 due to the antiferromagnetic coupling caused by the nonmagnetic layer 76. Thus, like stack 10, in stack 60 a perpendicular coupling between the free layer 64 and the pinned layer 62 can be obtained by a single pinning heat treatment, e.g., by a one-step annealing process.

FIG. 4 shows, as a fourth embodiment, a stack 90 of layers of a magnetoresistive (MR) structure. The stack 90 includes a pinned layer 92 and a free layer 94 separated by a nonmagnetic spacer layer 96. The pinned layer 92 includes a synthetic antiferromagnetic (SAF) layer 98. The SAF layer 98 includes a ferromagnetic layer (FM3) 100 and a ferromagnetic layer (FM4) 102 separated by a nonmagnetic layer (NM) 104. The pinned layer 92 also includes a ferromagnetic layer (FM1) 106. The pinned layer 92 further includes an insulating layer (NOL) 108 between the ferromagnetic layer (FM1) 105 and the SAF layer 98. The pinned layer 92 is formed on an AFM layer (AFM1) 110. The free layer 94 includes a layer (FM2) of ferromagnetic material. An AFM layer (AFM2) 112 is formed on the free layer 94. Additional layers (not shown) of the MR structure can include electrodes and/or protective layers.

The stack 90 illustrates an alternative approach to the above embodiments, showing that the twisted coupling can alternately be implemented in the pinned layer 92.

In stack 90, the pinned direction of magnetization of the pinned layer (FM1) 106 is substantially parallel to the magnetization direction of the ferromagnetic layer (FM2) 94. The magnetization direction of the pinned layer (FM1) 106 is set by exchange coupling with the AFM layer (AFM1) 110, and the magnetization direction of the pinned layer (FM2) 94 is set by exchange coupling with the AFM layer (AFM2) 112. The magnetization direction of the ferromagnetic layer (FM4) 102 is perpendicular to the magnetization direction of the ferromagnetic layer (FM1) 106 due to twisted coupling caused by the insulating layer (NOL) 108 as discussed above in connection with stack 10. The magnetization direction of the ferromagnetic layer (FM3) 100 is substantially perpendicular to the magnetization direction of the pinned layer (FM2) 94 and is antiparallel to the magnetization direction of the ferromagnetic layer (FM4) 102. The magnetization direction of the ferromagnetic layer (FM3) 100 is set antiparallel to the magnetization direction of ferromagnetic layer (FM4) 102 due to the antiferromagnetic coupling caused by the nonmagnetic layer 104. Thus, like stack 10, in stack 90 a perpendicular coupling between the free layer 94 and the pinned layer 92 can be obtained by a single pinning heat treatment, e.g., by a one-step annealing process.

Still further embodiments are contemplated, and additional layers not shown in the above embodiments can be added to the MR structures. For example, a twisted coupling can be implemented in both the free and pinned layers, where each of the pinned and free layers includes a series of ferromagnetic/NOL/ferromagnetic layers. Such an MR structure can thus have a parallel relationship between the magnetization directions of the free and pinned layers.

There are a variety of fabrication methods that can be employed for fabrication of MR structures that include stacks such as those disclosed in the above four embodiments. Such MR structures can be fabricated, for example, by depositing layers using thin-film deposition methods such as various types of sputtering, vacuum evaporation, and molecular beam epitaxy; oxide and/or nitride layers can be formed, for example, by using known oxidation methods such as oxygen-plasma oxidation or natural oxidation processes. For example, a synthetic free layer (e.g., FM2/NOL/FM3 in stack 10, FM4/NOL/FM3 in stack 30, FM2/NOL/FM4 in stack 60) can include forming, by sputter deposition, a CoFe film, then forming a natural oxide thereon by exposing the CoFe film to pure oxygen at a pressure of 1 mTorr for 1 min. Alternately, a plasma oxide can be formed by subjecting the CoFe film to oxygen plasma for 10 s at an oxygen partial pressure of 3 mTorr. Examples of suitable thicknesses for the layers are summarized in Table 1 below, which can apply to any embodiment of the present MR structures, including any of the disclosed embodiments. It should be noted that these thicknesses are not intended to be limiting in any way, but instead are provided merely as examples. It should also be noted that the use of the term "layer" should not be construed to impose limitations, particularly with respect to how a "layer" is formed, for example a "layer" as referred to herein can be formed by one or multiple layer-forming steps, such as using one or more steps of deposition for forming what is termed herein as a "layer".

TABLE 1

| Layer | Exemplary Thickness Range (Å) | Exemplary Thickness (Å) |
| --- | --- | --- |
| FM1 | 10-50 | 20 |
| FM2 | 10-50 | 20 |
| FM3 | 10-50 | 20 |
| FM4 | 10-50 | 20 |
| AFM1 | 100-500 | 200 |
| AFM2 | 100-500 | 200 |
| NOL | 5-20 | 10 |
| SPACER | 5-20 | 10 |
| NM | 5-20 | 10 |

The ferromagnetic layers (e.g., FM1-FM4) can be composed of cobalt (Co), iron (Fe), nickel (Ni), or alloys containing these elements. For example, materials that can be used for the ferromagnetic layers can be a $Co_{90}Fe_{10}$ (at %) alloy, a CoFeNi alloy, or a $Ni_{80}Fe_{20}$ alloy (permalloy). A SAF structure (e.g., SAF 40, 70, 98) can be, for example, a CoFe/Ru/CoFe stacked film. A synthetic free layer (e.g., FM2/NOL/FM3 in stack 10, FM4/NOL/FM3 in stack 30, FM2/NOL/FM4 in stack 60) can be, for example, a $Co_{90}Fe_{10}/O_x/Co_{90}Fe_{10}$ stacked film. Similarly, the synthetic pinned layer FM4/NOL/FM1 in stack 90 can be, for example, a $Co_{90}Fe_{10}/O_x/Co_{90}Fe_{10}$ stacked film. An antiferromagnetic (e.g., AFM1, AFM2) layer can be formed of a manganese (Mn)-based alloy containing, for example, platinum (Pt), iridium (Ir), rhodium (Rh), ruthenium (Ru), or palladium (Pd). For example, materials that can be used for forming an AFM layer can be a PtMn alloy, a PtPdMn alloy, or an IrMn alloy. The spacer can be formed of an insulating material, for example an $AlO_x$ oxide such as $Al_2O_3$ or a nitride such as AlN.

The magnetoresistance structures disclosed herein, such as embodiments of the described referring to FIGS. 1 through 4, can be incorporated in, e.g., a recording/reproducing integral magnetic head assembly, to be mounted in a magnetic reading system.

Figure 5:
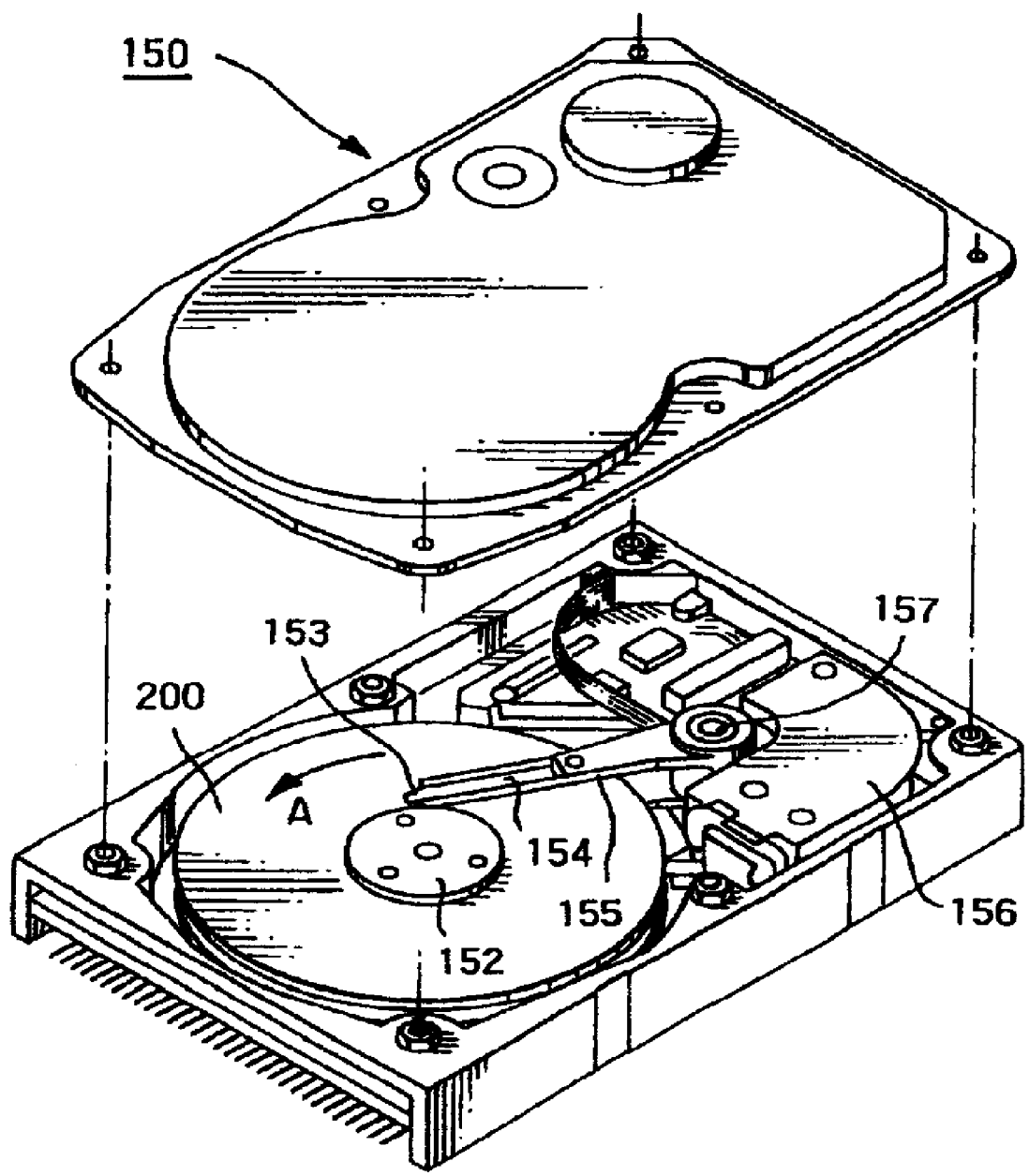
FIG. 5 shows a perspective view of a magnetic recording system that can include any of the MR structures shown in FIGS. 1-4.

FIG. 5 shows a perspective view of an exemplary magnetic recording system 150. The magnetic recording (and/or reading) system 150 includes a longitudinal recording or vertical recording magnetic disk 200 mounted on a spindle 152. The disk 200 is rotated in a direction of arrow A by means of a motor (not shown) which is driven in response to a control signal from a drive unit control part (not shown). The magnetic disk 200 has a longitudinal recording or vertical recording layer. A head slider 153 for recording/reading information in the magnetic disk 200 is mounted on the tip of a thin-film-like suspension 154. The head slider 153 has a magnetic head, which uses a magnetoresistance structure, such as in any one of the above described embodiments, in the vicinity of the tip thereof.

As the magnetic disk 200 rotates, the medium facing surface (ABS) of the head slider 153 is held so as to be spaced from the surface of the magnetic disk 200 by a predetermined flying height.

The suspension 154 is connected to one end of an actuator arm 155 which has a bobbin portion for holding a driving coil (not shown). On the other end of the actuator arm 155, there is provided a voice coil motor 156 which is a kind of linear motor. The voice coil motor 156 comprises a driving coil (not shown) wound onto the bobbin portion of the actuator arm 155, and a magnetic circuit comprising a permanent magnet and a facing yoke which face each other so as to sandwich the coil therebetween.

The actuator arm 155 is held by ball bearings (not shown) which are provided at two places above and below a fixed axis 157, and is rotatable and slidable by the voice coil motor 156.

Figure 6:
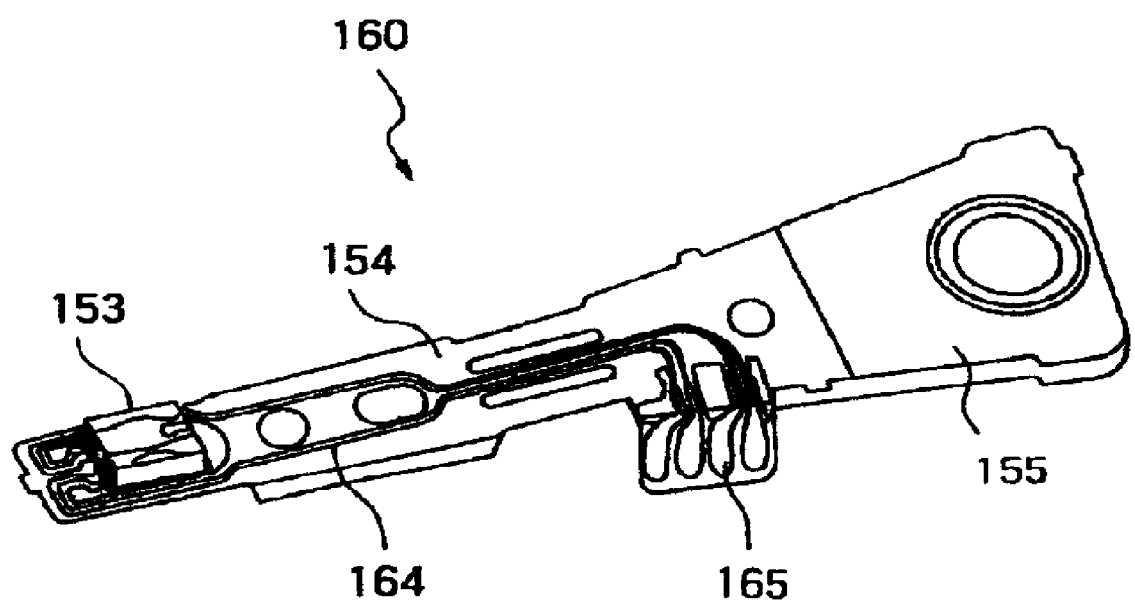
FIG. 6 shows a perspective view of a magnetic head assembly that can include any of the MR structures shown in FIGS. 1-4.

FIG. 6 shows an enlarged perspective view of a magnetic head assembly 160 as viewed from the side of a disk. The magnetic head assembly 160 has an actuator arm 151 having, e.g., a bobbin portion for holding a driving coil, and a suspension 154 is connected to one end of the actuator arm 155.

A head slider 153 having a reading magnetic head that includes a magnetoresistance structure, such as in any one of the above described embodiments, is mounted on the tip of the suspension 154. A recording head can be combined therewith. The suspension 154 has a lead wire 164 for transmission of writing and/or reading signals. This lead wire 164 is electrically connected to the respective electrodes of the magnetic head incorporated in the head slider 153. In the figure, reference number 165 denotes an electrode pad of the magnetic head assembly 160. A predetermined flying height is set between the medium facing surface (ABS) of the head slider 153 and the surface of the magnetic disk 200.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A magnetoresistive structure, comprising:
   a pinned layer comprising a first ferromagnetic layer having a pinned first magnetization direction;
   a first antiferromagnetic layer exchange coupled to the first ferromagnetic layer;
   a spacer layer;
   a free layer separated from the pinned layer by the spacer layer, the free layer comprising a second ferromagnetic layer having a single free second magnetization direction perpendicular to the first magnetization direction, and a third ferromagnetic layer having a pinned third magnetization direction parallel to the first magnetization direction; and
   a second antiferromagnetic layer exchange coupled to the third ferromagnetic layer, wherein the free layer further comprises a first insulating layer between the second and third ferromagnetic layers.

2. A structure according to claim 1, wherein the first and second antiferromagnetic layers are concurrently initialized in a single sequence of heating and subsequent cooling in a magnetic field.

3. A structure according to claim 1, wherein the first insulating layer comprises a structure sufficient to set the free second magnetization direction perpendicular to the first direction in the absence of an external magnetic field.

4. A structure according to claim 1, wherein the first insulating layer comprises an oxide.

5. A structure according to claim 4, wherein the oxide is a nano-oxide-layer.

6. A structure according to claim 1, wherein the first insulating layer comprises nitride, boride or fluoride.

7. A magnetoresistive structure, comprising:
   a first ferromagnetic layer having a pinned first magnetization direction set by exchange coupling;
   a spacer layer; and
   a second ferromagnetic layer having a single free second magnetization direction substantially perpendicular to the first magnetization direction, wherein the spacer layer interposes the first ferromagnetic layer and the second ferromagnetic layer; and
   a third ferromagnetic layer having a pinned third magnetization direction set by exchange coupling, wherein the third magnetization direction is substantially parallel to the first magnetization direction; and
   an insulating layer between the second ferromagnetic layer and the third ferromagnetic layer sufficient to set the free second magnetization direction perpendicular to the first direction in the absence of an external magnetic field.

8. A structure according to claim 7, comprising a free layer, wherein the free layer comprises the second and third ferromagnetic layers.

9. A structure according to claim 8, wherein the insulating layer between the second ferromagnetic layer and the third ferromagnetic layer comprises a nano-oxide layer.

10. A magnetoresistive structure, comprising:
    a first antiferromagnetic layer;
    a pinned layer comprising a first ferromagnetic layer having a pinned first magnetization direction set by exchange coupling with the first antiferromagnetic layer;
    a spacer layer;
    a free layer comprising a second ferromagnetic layer and a third ferromagnetic layer, wherein the free layer further comprises an insulating layer between the second ferromagnetic layer and the third ferromagnetic layer; and
    a second antiferromagnetic layer,
    wherein the spacer layer interposes the free layer and the pinned layer,
    wherein the second ferromagnetic layer has a single free second magnetization direction substantially perpendicular to the first magnetization direction,
    wherein the third ferromagnetic layer has a pinned third magnetization direction set by exchange coupling with the second antiferromagnetic layer, and
    wherein the first and second antiferromagnetic layers have substantially equal blocking temperatures.

11. A structure according to claim 10, wherein the insulating layer comprises an oxide.

12. A structure according to claim 10, wherein the first magnetization direction is substantially parallel to the third magnetization direction.

13. A structure according to claim 10, wherein the insulating layer comprises nitride, boride or fluoride.

* * * * *